Sept. 23, 1958          E. UHER          2,852,950
SELF-ADJUSTING WEDGE-SHAPED BELT VARIABLE DRIVE
Filed Oct. 7, 1954          2 Sheets-Sheet 1
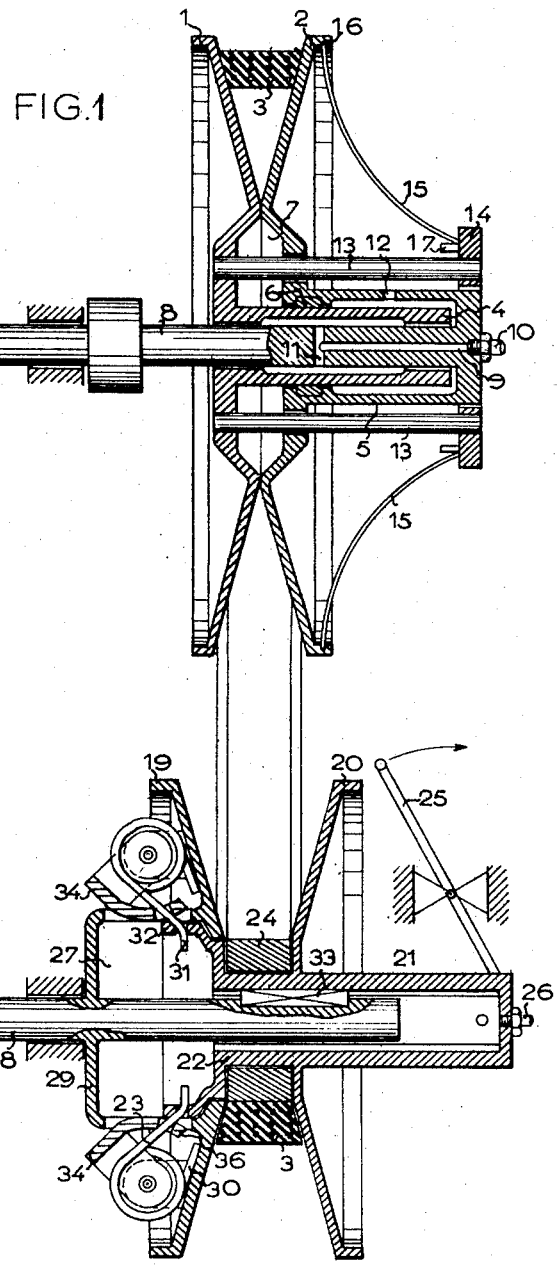
Inventor
E. Uher
By Glascock Downing Seebold
Attys.

Sept. 23, 1958           E. UHER           2,852,950
SELF-ADJUSTING WEDGE-SHAPED BELT VARIABLE DRIVE
Filed Oct. 7, 1954           2 Sheets-Sheet 2
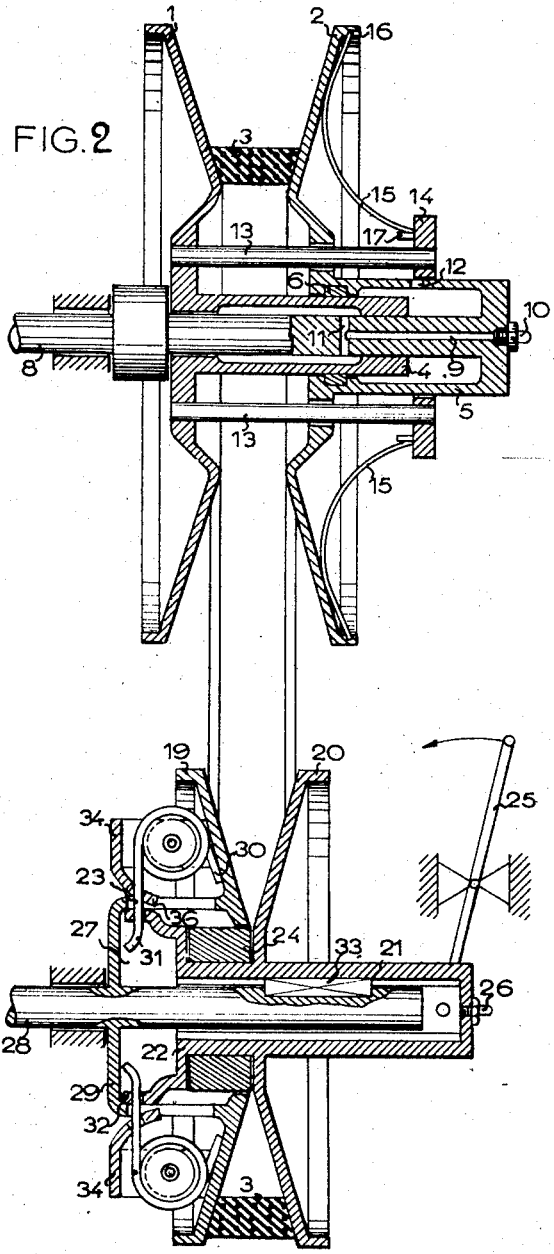
Inventor
E. Uher 2,852,950

SELF-ADJUSTING WEDGE-SHAPED BELT VARIABLE DRIVE

Edmond Uher, Cap D'Antibes, France

Application October 7, 1954, Serial No. 460,968

Claims priority, application Germany October 8, 1953

2 Claims. (Cl. 74—230.17)

This invention relates to wedge-shaped belt variable drives of the type comprising a driving pulley and a driven pulley, each constituted by two frustro-conical pulley sections continuously urged axially towards one another by elastic means, whereby the wedge-shaped belt is clamped between the said sections, the device adjusting itself automatically by a radial shift of the belt on both pulleys varying the radii of action of the driving pulley on the belt and of the latter on the driven pulley, in response to variations of the speed of rotation of the driving pulley, of the driving torque to be transmitted and also of the resisting torque acting on the driven pulley.

Most of these devices are also provided with a free-wheel member that is freely rotatable on the driving shaft between the sections of the driving pulley, said free wheel member being adapted to receive the belt for de-clutching the same from the driving pulley when the sections of the latter assume their maximum spacing.

None of the existing drives of this type are capable of meeting all conditions required for use as a variable-ratio transmission with automatic de-clutching in an engine-driven vehicle. In particular, they often react too slowly to variations of the transmitting conditions. For example, if the speed of the engine is suddenly increased in order to accelerate the vehicle, the wedge-shaped belt does adjust itself radially on the pulleys, but only after a considerable delay, due to the fact that the elastic means urging the sections of the driving pulley towards each other are of insufficient strength to cause the sudden shift required for determining a quick increase of the radius of action of the driving pulley on the belt. Similarly, upon decrease of the resisting torque, the radius of action of the belt on the driven pulley, must be reduced, which usually occurs too slowly, due to the increasing resistance of the elastic means opposing the wedging effect of the belt on the said driven pulley.

An object of the invention is to provide a wedge-shaped or V-belt variable drive of the type described, wherein control means are associated with the axially movable section of the driving pulley whereby the operator can, at will and as suddenly as desired, adjust the ratio of transmission of the drive, regardless of the position assumed by the belt on both pulleys under the automatic self-adjusting action of the drive.

This arrangement permits, in particular, deliberate de-clutching under conditions which do not correspond to automatic de-clutching or effecting a sudden change of the transmission ratio, e. g. upon sudden variations of the conditions of transmission, when the self-adjustment of the belt is too slow.

It is to be understood that in this specification and in the appended claims, as well as in my co-pending applications, Serial No. 460,969, filed October 7, 1954, now Patent No. 2,795,962 and entitled Wedge-Shaped Belt Variable Drive, and Serial No. 460,970, filed October 7, 1954, now abandoned, entitled Device for Clutching a Wedge-Shaped Belt With its Driven Pulley, the words "clutching," "de-clutching," and any similar term, relate to the frictional engagement or clutch-like coupling between the frustro-conical sections of the driving pulley and the inclined side faces of the belt.

Another object of the invention is to provide a wedge-shaped belt drive of the type described, wherein fly-weights are provided on the driving pulley to cooperate, to an extent increasing with the speed of rotation of the said driving pulley, with the usual elastic means urging the sections of the driving pulley towards each other, while the loading elastic means opposing the wedging action of the belt on the driven pulley are so designed that their strength progressively decreases as the speed of rotation increases.

It is obvious that with this arrangement both increase of the radius of action of the driving pulley on the belt and reduction of the radius of action of the belt on the driven pulley, in response to increase of the speed of rotation or reduction of the resisting torque are facilitated.

The association in a wedge-shaped belt variable drive, of the above described features, to wit, control means, fly-weights and specially designed elastic means, provides an excellent variable speed drive with automatic or operator controlled clutching, de-clutching and adjustment of the transmission ratio.

Other objects and advantages of the invention will be apparent from the following detailed description, together with the accompanying drawing, submitted for purpose of illustration only and not intended to define the scope of the invention, reference being had for that purpose to the subjoined claims.

Figure 1 is a vertical, sectional view partly in elevation illustrating the drive with the sections of a driving pulley at their maximum spacing apart, and Figure 2 is a similar view illustrating the sections of the driving pulley at their minimum spacing.

The sections of the driving pulley are shown at 19 and 20, respectively. In the example shown, only the section 20 is axially movable along the driving shaft 28.

To permit this motion, the hub of the section 20 is constituted by a sleeve slidably mounted on the driving shaft 28 and including portions 21 and 22 extending axially beyond opposite sides of the frusto-conical portion of the slideable pulley section 20.

The sleeve portion 22 is freely engaged in the axially fixed section 19 and is continuously urged towards the same by torsion springs 23 of the type acting by spreading of their arms, such as are used in clothes-pegs, mouse-traps and the like. One arm 30 of each spring 23 bears on the outer face of the flange 19, while its other arm 31 is engaged in a hole provided in the wall of a cup-like terminal extension 32 of the sleeve portion 22. The said cup-like extension 32 is surrounded by a casing-like mantel 29 integral with the driving shaft 28 and inter-connecting the same with the pulley section 19. The other sleeve portion 21 of the hub of pulley section 20 is keyed to the driving shaft 28 by a spline 33. On the sleeve portion 22 is freely journalled a ring 24 functioning as a loose pulley over which the wedge-shaped belt 3 runs when the driving pulley sections 19 and 20 are sufficiently spaced apart from each other, so that the said belt is no longer driven by the side faces of the driving pulley. Fly-weights 34 are pivoted to the outer face of pulley section 19 for movement about pivot-pins extending at right-angles to the axis of the shaft 28. The weights have tilting motion in radial planes of the pulley section under the action of centrifugal force. Each one of the said weights carries at its free end an apertured hooking member 36 through which passes the arm 31 of an associated spring 23.

When the pulley sections 19 and 20 are in their maximum spaced position, Figure 1, the fly-weights 34, due to the speed of rotation of the driving pulley, are held in a position inclined towards the shaft 28.

As the speed of rotation of the sections 19 and 20 increases, the fly-weights 34 tend to be tilted radially outwards, thus acting through the arms 31 of the springs 23 and in cooperation therewith, in such a manner as to axially displace the dish-like extension 32 and thus the hub portions 22—21 and pulley section 20 in the direction tending to bring the section 20 towards the section 19. Consequently, the overall force tending to reduce the spacing between the two pulley sections 19 and 20 increases with the speed rotation.

In particular, when the speed of rotation of the driving shaft 28 suddenly increases, the above described arrangement facilitates the radial outward shift of the belt 3 and, hence, the increase of the radius of action of the driving pulley on the belt.

When the belt 3 runs over the loose ring 24, it is no longer in contact with the frustro-conical faces of the pulley sections 19 and 20. It, therefore, is no longer driven by the driving shaft 28 and due to this arrangement, the self-adjustable variable drive, according to the invention, requires no auxiliary coupling or clutching device.

The sleeve-portion 21 is acted upon by a control lever 25 operative to displace the said sleeve, and hence, the pulley section 20, axially, at least in the direction opposed to the action of the springs 23.

This control lever permits extraneous intervention on the automatic self-adjustment of the drive, e. g. for setting the same into a required transmission ratio in a quick and sudden manner, for example upon a sudden increase of the resisting torque for which the response time of the self-adjustment would be too long. The lever 25 also permits varying or at least increasing the demultiplication up to de-clutching. Locking means may be provided, if desired, to hold the control lever 25 in its position corresponding to a maximum spacing between the two sections 19 and 20 to permit maintaining the drive in a de-clutched condition.

The sleeve 21 integral with pulley section 20 is provided with a grease fitting 26. Oil or grease introduced under pressure into said fitting is fed into the space 27 constituted by the interior of the casing 29 that connects pulley section 19 with the shaft 28. Grease under pressure can escape from the casing 29 in the vicinity of the bearing areas of the springs 23, thus lubricating the said bearing areas, while being prevented from reaching the space between the pulley sections 19 and 20.

The sections of the driven pulley are indicated at 1 and 2. In the example shown, only the section 1 is adapted to be displaced axially along the driven shaft 8. The wedge-shaped belt 3 is clamped between the two sections of the driven pulley and the section 1 is carried by a sleeve-like hub 4, that, in the drawing, extends towards the right, and which is slidably engaged in the hollow hub 5 of the axially fixed section 2. The axial sizes of the two hubs 4 and 5 are so selected that when the sections 1 and 2 are spaced by a maximum distance apart, Figure 2, a portion of hub 4 remains engaged within the hub 5. Between the hubs 4 and 5 is interposed a packing ring 6 for sealing the space 7 comprised between the sections 1 and 2 against any penetration of lubricant.

The hub 5 of pulley section 2 is integral with the driven shaft 8 and is provided with an axial bore 9 communicating with a grease fitting 10. The said axial bore 9 communicates with a transverse bore 11 extending through the shaft 8, so that the lubricant introduced under pressure through fitting 10 penetrates first between the hub 4 and the shaft 8 and, thence, between the hubs 4 and 5.

Any excess lubricant may escape through an opening 12 provided in the wall of the hub 5, at a zone thereof from which lubricant cannot reach the space between the two pulley sections 1 and 2 of the driven pulley. This is essential, since the sections of the pulley must be protected against any lubricant in order to be capable of suitable operation.

Pulley section 1 is provided with rigidly mounted, elongated bolts 13 that extend axially thereof, and pass through holes provided in the section 2 and are secured at their free ends to a ring-shaped member 14, slidably mounted on the hub 5.

Between the axially fixed sections 2 and the ring-shaped member 14 are interposed leaf springs 15.

The outturned end of rim section 2 has an internal groove 16, formed therein for receiving one end of each spring 15. The other end of each spring bears against an abutment 17 provided on the ring-shaped member 14, the springs 15 being somewhat pre-bent. The radius of curvature of the springs 15 is at a maximum when the sections 1 and 2 are at their closest relative position, Figure 1. The leaf springs 15 operate in the absence of any intermediate member, and this arrangement is advantageous since any such intermediate member would be subjected, to a considerable extent, to the action of centrifugal force and hence would be liable to reduce the efficiency of the springs 15. The latter have but a very small mass so that the action they undergo from the centrifugal force is negligible.

The leaf springs 15 could, if desired, be replaced by torsion springs with spreading arms such as the springs 23 of the driving pulley. Such torsion springs would also undergo a change of their direction of action upon axial shifting of the section 1.

When the lateral thrust exerted by the wedge-shaped belt 3 on the sections 1 and 2 increases, there is an increase in the force urging the ring-shaped member 14 towards the section 2, which causes an axial shifting of the ring-shaped member 14 towards section 2, whereby the leaf springs 15 undergo a deformation tending to reduce their radius of curvature.

Thus, as the axial displacement of the section 1 increases, and when the said section is displaced towards the left from the position of Figure 1, to that of Figure 2, the resistance opposing this displacement, instead of increasing as with conventional springs, is progressively reduced since the direction of the force exerted by the springs becomes more inclined towards the axis of the pulley or in other words, tends to become more radial and less axial.

This arrangement aids self-adjustment of the belt 3 in response to variations of the resisting torque, primarily when the belt is in the vicinity of the periphery of the driven pulley.

The progressive reduction of the axial force urging the section 1 towards section 2, as the spacing between the sections increases, may also be obtained by using two or more spring forces acting in different directions and/or offering different characteristics. Thanks to the fact that it is possible to modify, or even to suppress, at will and at any time, the self-adjusting feature of the drive, by acting upon the driving pulley by means of the control lever 25, the said lever even permitting deliberate de-clutching of the said driving pulley from the belt, the variable drive according to the invention is particularly well adapted to be used in engine-driven vehicles. When the drive is being clutched, since in its de-clutched condition the belt runs over the loose ring 24 of the driving pulley, it first assumes on the latter a radial position corresponding to the ratio of transmission determining a maximum demultiplication, so that the said maximum demultiplication is always available for starting the vehicle. De-clutching by means of the control lever always takes place progressively from any value of the transmission ratio between maximum multiplication and maximum demultiplication. It is obvious that this could not be obtained with a wedge-shaped belt variable drive associated with an independent clutch device, since, in this case, the ratio of transmission remains unchanged by de-clutching, whatever may be its value before de-clutching. In these conditions, with such an independent clutching device, if de-clutching takes place, for example, at maximum multiplication, the maximum demultiplication required for starting the vehicle is not automatically obtained as soon as the drive is clutched, as in the device according to the invention, but setting to the said maximum demultiplication requires adjustment of the drive, after clutching, from maximum multiplication.

The variable drive according to the invention is the result of a long and extensive development work. Practical tests extended to all conditions of driving of engine vehicles have shown that the variable drive according to the invention meets all requirements in this scope.

What is claimed is:

1. A self-adjustable variable drive comprising, in combination, a drive shaft, a driven shaft, a driving pulley and a driven pulley keyed on the respective drive and driven shafts, each pulley including two frustro-conical sections, at least one of which is axially movable along its associated shaft, a wedge-shaped belt trained over said pulleys, a first elastic means operative to continuously urge said driving pulley sections towards each other, flyweights articulated on a section of said driving pulley in radial planes thereof and adapted to urge said driving pulley sections towards each other with a force varying as a direct function of the speed of rotation of said driving pulley, second elastic means operative to urge said driven pulley sections towards each other with a force decreasing as the space between said last mentioned sections is increased, and operator-actuated control means operatively connected with the axially movable section of said driving pulley for shifting the same axially against the action of said first mentioned elastic means and said fly-weights, independently of the self-adjusting action of the drive and at least in the direction in which its spacing from the other section of the driving pulley increases.

2. A self-adjustable variable drive according to claim 1 and including abutment means on one of said driven pulley sections and abutment means on the other driven pulley section near the axis thereof, said abutment means being axially spaced in any relative position of the sections and being located on the same side of the assembly constituted by the two sections and said second elastic means being constituted by a plurality of slightly pre-bent leaf springs interposed between the respective abutment means, whereby the inclination of the direction of action of each one of said leaf springs in respect to the axis of the driven pulley increases and consequently the axial component of said action decreases, as the space between the said sections is increased.

References Cited in the file of this patent

UNITED STATES PATENTS

| 1,501,705 | Decoux | July 15, 1924 |
| 2,553,505 | Miner | May 15, 1951 |
| 2,556,512 | Ammon | June 12, 1951 |

FOREIGN PATENTS

| 551,872 | France | Jan. 15, 1923 |
| 435,257 | Great Britain | Sept. 18, 1935 |